April 12, 1955  S. E. MILLER ET AL  2,705,812
WINDSHIELD WIPER HAVING A PARKING MECHANISM
Filed June 19, 1952  2 Sheets-Sheet 2
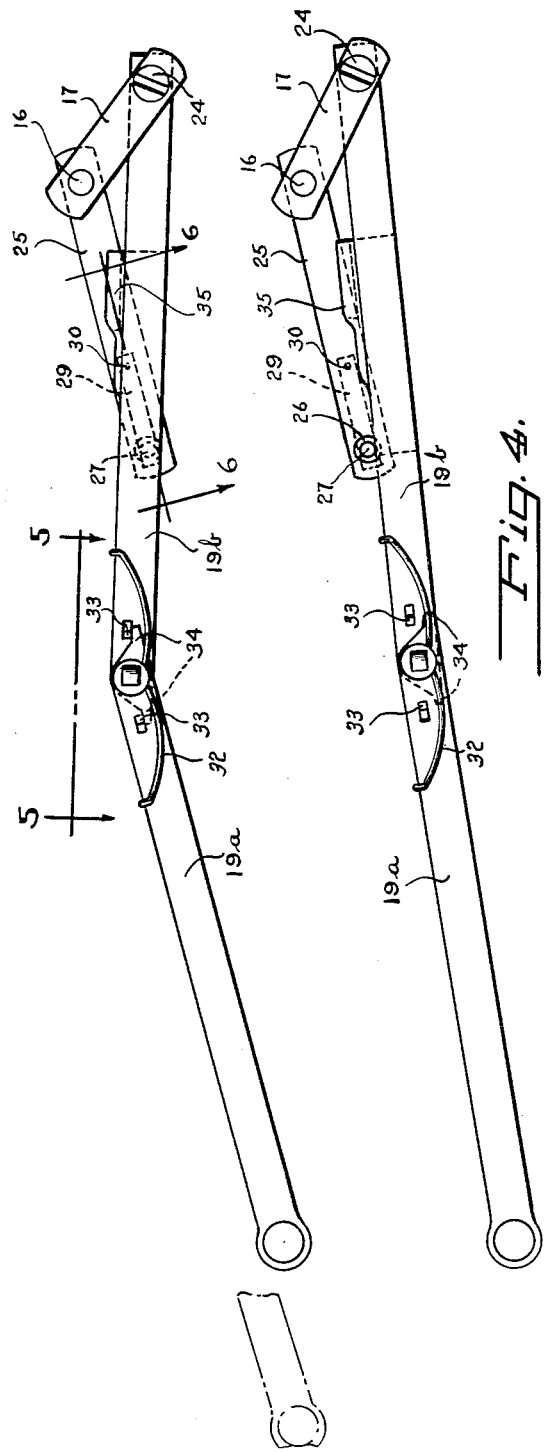
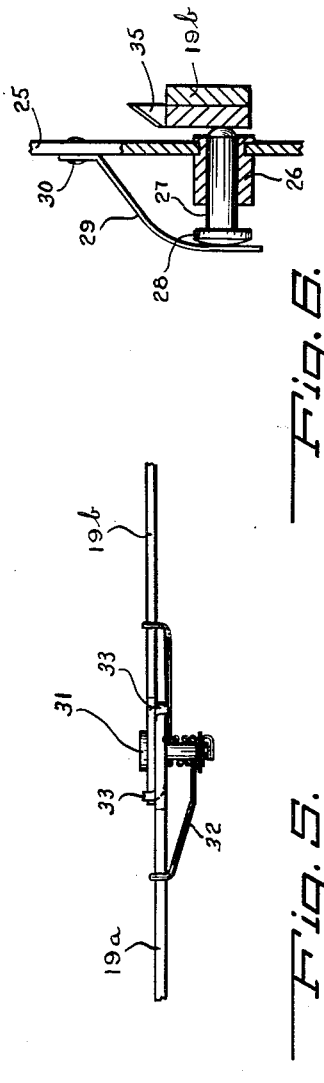
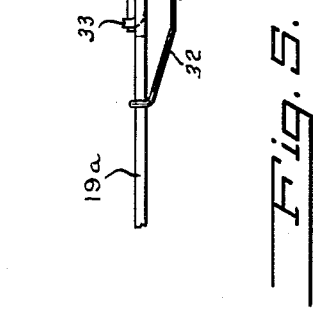
INVENTORS.
SIDNEY E. MILLER
BY STANLEY M. TERRY
Raymond A. Paquin
ATTORNEY.

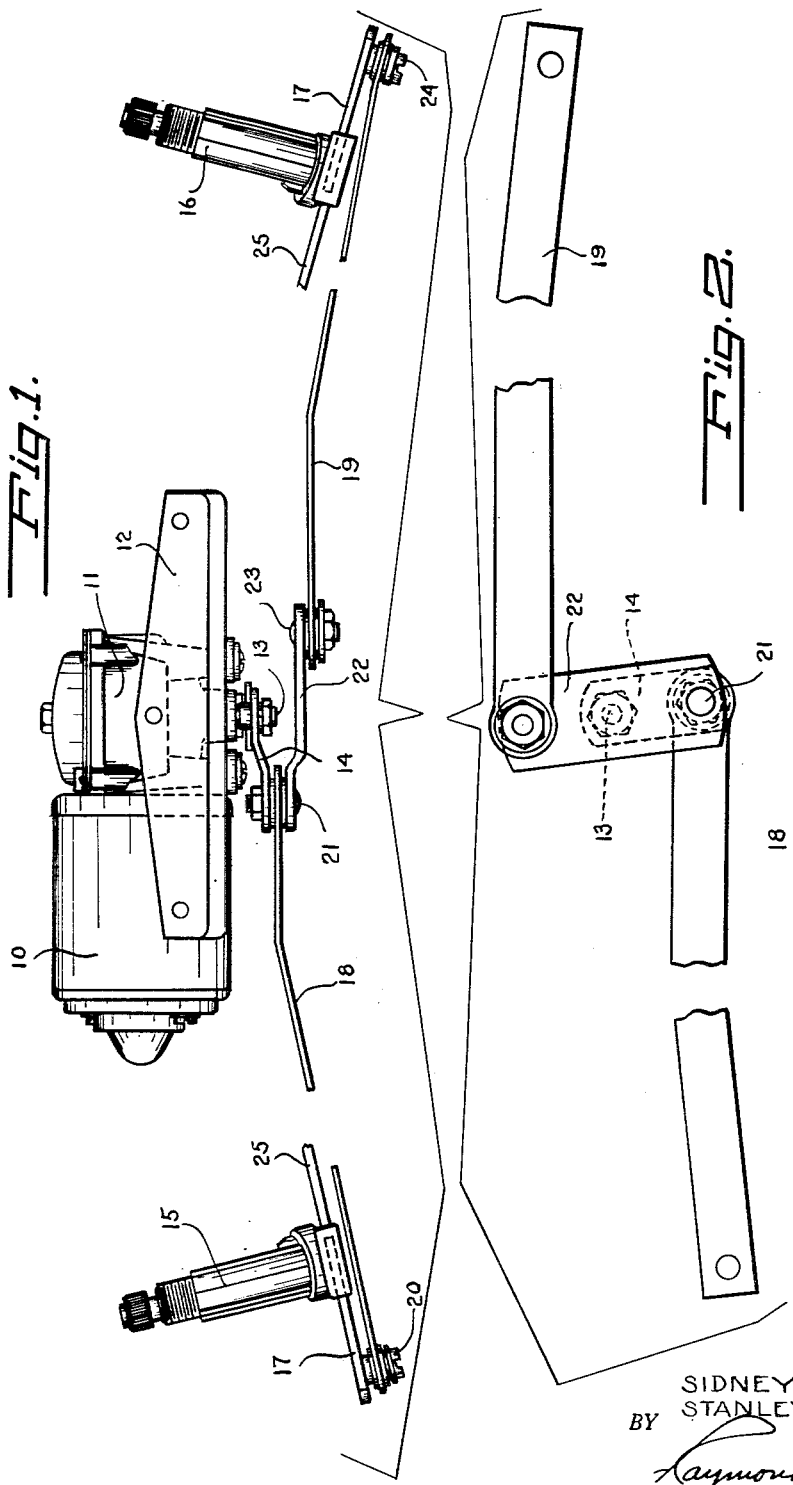

United States Patent Office 2,705,812
Patented Apr. 12, 1955

2,705,812

WINDSHIELD WIPER HAVING A PARKING MECHANISM

Sidney E. Miller, Suffield, Conn., and Stanley M. Terry, Longmeadow, Mass., assignors to American Bosch Arma Corporation, a corporation of New York Application June 19, 1952, Serial No. 294,355

5 Claims. (Cl. 15—253)

This invention relates to windshield wipers and particularly to windshield wiper actuating means adapted to be operated by a reversible, rotatable driving means and wherein it is desired that the wiper blades and arms be parked outside of the normal wiping pattern or angle.

An object of the invention is to provide such an apparatus wherein the parking of the windshield wiper blades and arms outside of the normal wiping pattern or angle is effected without increasing the size of such wiping pattern or angle.

Another object is to provide a new and improved arrangement of the type set forth which is relatively simple and economical in construction yet efficient in operation.

Another object of the invention is to provide a windshield wiper of the type set forth which is adapted to be driven by a reversible electric motor in which the wiper blades and arms are movable or oscillated through a normal operating range and then such operating range or pattern shifted upon reversal of the motor whereby the wiping element is automatically stopped or parked at its limit of the movement outside of the normal wiping range or pattern.

Another object is to provide a device of the type set forth wherein the effective length of the wiper actuating linkage is automatically increased or decreased depending upon direction of rotation of the motor.

Another object is to provide a wiper actuating mechanism wherein a crank is employed for reciprocating the wiper actuating linkage and wherein the reversal of the motor automatically effects an increase in the effective length of the linkage and thereby results in the parking of the wiping element outside of its normal wiping pattern.

Other objects and advantages of the invention will be apparent from the following description taken in connection with the accompanying drawings. It will be understood that changes may be made in the details of construction and arrangement of parts without departing from the scope of the invention as set forth in the accompanying claims, as the preferred form has been given by way of illustration only.

Referring to the drawings:

Fig. 1 is a top or plan view of a wiper apparatus embodying the invention;

Fig. 2 is a fragmentary, front view of the apparatus shown in Fig. 1;

Fig. 3 is a front view showing one of the linkage mechanisms embodying the invention during the normal wiping operation;

Fig. 4 is a view similar to Fig. 3 and showing the same linkage during the parking operation;

Fig. 5 is a fragmentary, top view of the linkage shown in Figs. 3 and 4 and taken on line 5—5 of Fig. 3 looking in the direction of the arrows; and Fig. 6 is a sectional view taken on line 6—6 of Fig. 3 looking in the direction of the arrows.

Referring more particularly to the drawings wherein similar reference characters designate corresponding parts throughout, the apparatus shown embodying the invention comprises the electric motor 10 and gear housing 11 secured on the bracket or support 12 adapted to be secured beneath the windshield of the vehicle on which the apparatus is to be employed.

The motor 10 is a reversible motor and is adapted to drive the drive shaft 13 through suitable gearing in gear housing 11 in opposite directions.

Crank arm 14 is mounted on shaft 13 and adapted to be driven thereby.

The windshield wiper drive shafts 15 and 16 are adapted to be mounted in conventional manner and to oscillate the conventional windshield wiping arms and blades upon the oscillation of the cranks 17 by the links 18 and 19. Link 18 is pivotally connected to crank arm 17 through pin 20 and said link 18 is pivotally connected at its opposite end to stud 21 which is connected to crank arm 14 and drive plate 22 and at the opposite end of drive plate 22, link 19 is connected by means of stud 23. Link 19 is connected at its opposite end through pin 24 to crank member 17.

Linkages 18 and 19 are similar and, therefore, for the purpose of illustration, only one of said links 19 has been shown in detail in Figs. 3 through 6.

On each of the supports for the wiper shafts 15 and 16 is provided a fixed bar 25 having a bearing 26 extending therethrough and a plunger 27 sliding in bearing 26. Plunger 27 is provided with the head 28 to limit the extent of its movement through the bearing 26 and is retained within the bearing by means of the leaf spring 29 which has one end secured to the plate 25 at 30 and which has its free end engaging the head of plunger 27. Instead of leaf spring 29, other forms of springs such as a coil spring could be employed for the same purpose.

The linkages 18 and 19 each comprise a pair of link portions. For the purpose of illustration and as the two linkage assemblies are similar, only link 19 composed of sections 19a and 19b, which are pivotally connected by hinge pin 31, have been shown. The link sections 19a and 19b are resiliently connected by spring 32 on pivot pin 31 for normally retaining the sections 19a and 19b in angular relation as shown in Fig. 3. Each of linkage sections 19a and 19b is provided with a stop 33 adapted to be engaged by a projection 34 on the end of the opposite linkage section for limiting the amount of relative pivotal movement of the linkage sections 19a and 19b. The coil spring 32 is provided for normally holding the linkages in such position that the stops are in engagement, thus fixing the relative positions of the linkage sections for normal operation.

This angular relation in which the linkage sections 19a and 19b are relatively retained in by means of the spring 32 decreases the effective length of the linkage for normal wiping operation.

Upon reciprocation of each of the linkages by crank arm 14 and drive plate 22 as previously described, the plunger 27 engages the cam surface 35 on the surface of link section 19b, thus allowing normal operation of the linkage without interference from the plunger by depressing the plunger when it engages cam surface 35.

When the direction of operation of the motor is reversed, thus reversing the direction of rotation of shaft 13 and crank 14 as well as drive plate 22, the linkage oscillates and the plunger 27 engages the upper surface of the link section 19b effectively aligning the linkage sections 19a and 19b as shown in Fig. 4 and thereby effectively increasing the effective length of the linkage which acts to shift the entire wiping pattern or angle of the wiping arm and blade as a unit on the windshield and allows the wiper blade and arm to be parked in a position beyond its normal wiping pattern or range and upon starting of the wiper motor with rotation in the opposite direction, the linkage again assumes the position shown in Fig. 3 and shifts the wiping pattern or angle of the wiping blade or arm to the normal wiping range.

From the foregoing it will be seen that we have provided simple, efficient and economical means for obtaining all of the objects and advantages of the invention.

We claim:

1. A windshield wiper actuating mechanism including an actuating member adapted to oscillate a wiping element over the surface of a windshield and to park said wiping e'ement beyond the normal range of its oscillation, an actuating member for oscillating said wiping element, a crank, a linkage connecting said crank and said actuating member, said linkage comprising a pair of sections normally retained in angular relation and means operable upon change of direction of rotation of said crank for urging said links toward aligned relation to vary the effective length of said linkage.

2. A windshield wiper actuating mechanism including an actuating member adapted to oscillate a wiping element over the surface of a windshield and to park said wiping element beyond the normal range of its oscillation, an actuating member for oscillating said wiping element, a crank, a linkage connecting said crank and said actuating member, said linkage comprising a pair of sections normally retained in angular relation and means operable upon change of direction of rotation of said crank for urging said links toward aligned relation to vary the effective length of said linkage, said means being operable upon change of direction of rotation of said crank.

3. In a windshield wiper having a wiping element adapted to be oscillated over the surface of a windshield and to be parked beyond the normal range of its oscillation, an actuating mechanism including means for actuating the windshield wiping element, a crank arm for actuating said actuating mechanism and linkage means connecting said actuating mechanism and crank arm, said linkage means including a pair of links pivotally connected relative to each other and means for normally retaining said links in angled relation, a bar in fixed position relative to said linkage, cam means on said linkage means and means on said bar and in cooperative position relative to said cam means and adapted to engage said cam means upon normal operation of said linkage and to engage said linkage upon reversal of direction of rotation of said crank arm to automatically vary the effective length of said linkage means in response to the direction of rotation of the crank.

4. In a windshield wiper having a wiping element adapted to be oscillated over the surface of a windshield and to be parked beyond the normal range of its oscillation, an actuating mechanism including means for actuating the windshield wiping element, a crank for actuating said actuating mechanism, linkage means connecting said actuating mechanism and said crank, cam means on one of said linkage portions and means adapted to engage said cam means upon normal operation of said linkage and to engage said linkage upon reversal of direction of rotation of said crank arm for automatically lengthening the effective length of said linkage means upon reversal of direction of rotation of said crank whereby said wiping element will be parked beyond the normal range of its operation.

5. A windshield wiper actuating mechanism including an actuating member adapted to oscillate a wiping element over the surface of a windshield and to park said wiping element beyond the normal range of its oscillation, an actuating member for oscillating said wiping element, a crank, a linkage connecting said crank and said actuating member, said linkage comprising a pair of sections normally retained in angular relation and means operable to engage one of said link sections upon reversal of direction of rotation of said crank for urging said links toward aligned relation to vary the effective length of said linkage.

References Cited in the file of this patent

UNITED STATES PATENTS

| | | |
|---|---|---|
| 2,232,480 | Schmid | Feb. 18, 1941 |
| 2,308,212 | Scott-Iverson | Jan. 12, 1943 |